Sept. 21, 1965 J. S. SHAPIRO 3,207,225
COAXIAL, CONTRAROTATIVE AIRCRAFT-LIFTING
OR/AND -SUSTAINING ROTOR SYSTEMS
Filed Aug. 14, 1962 2 Sheets-Sheet 1

United States Patent Office 3,207,225
Patented Sept. 21, 1965

3,207,225
COAXIAL, CONTRAROTATIVE AIRCRAFT-LIFTING OR/AND -SUSTAINING ROTOR SYSTEMS
Jacob Samuel Shapiro, 265 Finchley Road, Hampstead, London NW. 3, England
Filed Aug. 14, 1962, Ser. No. 216,780
3 Claims. (Cl. 170—135.27)

This invention relates to coaxial, contrarotative aircraft-lifting or/and -sustaining rotor systems, whose two component rotors are each of the type in which the several rotor blades are so mutually interconnected as to be incapable of flapping relatively to one another, but the whole rotor can tilt freely about at least one axis perpendicular to the rotational axis. The said type thus includes the so-called see-saw rotor having two opposed blades mounted, without freedom to flap independently, on a hub capable of flapping about an axis perpendicular to the spanwise direction of the blades, and also a rotor having three or more blades mounted, without freedom to flap independently, on a common hub capable of flapping in any azimuth, being mounted by means of an universal joint on the rotor axle.

An object of this invention is to provide a coaxial, contrarotative rotor system as defined above including a bearing assembly disposed between the upper and lower rotors, located concentrically with their common rotational axis, free to tilt in any azimuthal plane containing said rotational axis and comprising two race members free to rotate about their common centre independently of each other, one of said race members being constrained to rotate with the upper rotor hub and so linked thereto that it repeats the flapping motion of that hub and the other race member being constrained to rotate with the lower rotor hub and similarly linked thereto.

Since the two race-members are necessarily coplanar, or their planes are parallel, the above described arrangement imposes a mutual constraint on the flapping motions of the two rotors such that the angular flapping displacements of the two rotor hubs in at least one azimuthal plane containing the rotor axis are equal; and if this plane or planes are selected to coincide with the azimuthal planes in which the upper and lower rotor blades cross over each other, i.e. those azimuthal planes which, in the course of the contrarotation, contain the spanwise axes of upper rotor blades and of lower rotor blades, then there will be no risk of the upper and lower rotors fouling each other however closely the rotor hubs are axially spaced, subject to necessary allowance for flexure of the blades in their spanwise planes containing the rotor axis.

If drag hinges or/and feathering pivots (for pitch control, cyclic or/and collective) are provided they must be outboard of the link-attachments to the rotor hubs.

The case of two-bladed see-saw rotors is kinematically distinguishable from that of three or more-bladed rotors without independent blade flapping, but with universally tiltable hubs.

Since the hub of a see-saw rotor is only free to flap in one azimuthal plane (which plane contains (or lies close to) the common spanwise axis of the rotor blades) the link or links connecting the hub to the corresponding race member must lie in that azimuthal plane. Kinematically a single link for each rotor hub is sufficient, but for reasons of static and dynamic balance the links of each rotor hub will preferably be duplicated symmetrically of the rotor axis, each rotor hub being thus connected to the corresponding race member by a parallel linkage.

The links may be connected to the hubs by pivots whose axes are parallel to the flapping axis of the hub or by universal joints, and are universally pivoted to the race members. The mutual constraint of the flapping of the two rotors, is therefore only partial, so that each rotor hub only constrains the component of the flapping of the other rotor hub on its own flapping plane. When the flapping planes of the two rotor hubs are at right angles, there is no mutual constraint; but for the purpose of preventing mutual fouling of the upper and lower rotor blades this does not matter, because fouling could only ocur when the upper and lower rotor blades cross-over and in this position of the blades the mutual constraint is complete.

With fully tiltable hubs, each carrying three or more blades, the constraint exerted by each rotor hub on the other must be complete in all azimuths; and consequently each hub must be linked to the corresponding race member of the transfer bearing assembly by a least two links in different azimuthal planes, the links being universally jointed at both ends. Kinematically two links for each hub are sufficient, but again for reasons of balance, an arrangement of links symmetrical about the rotor axis is preferable, in which case the minimum number of links for each hub is three, forming a three-dimensional parallel linkage.

The accompanying drawings illustrate by way of example only two embodiments of the invention as applied to coaxial, contrarotative rotor systems.

In the drawings:

FIGURE 1 illustrates schematically in perspective the first embodiment, which has two, two-bladed rotors of the "underslung" see-saw type, in which the blades are mounted on a floating hub-like member suspended on pivots, whose common axis is parallel to the spanwise axis of the blades, from a rocking member supported by the rotor axle on a flapping pivot, and arrangement which facilitates cyclic pitch control of a see-saw rotor. For the purposes of this invention as hereinbefore described and as defined in the appended claims, the rocking member is to be identified as the "rotor hub."

Figure 1:
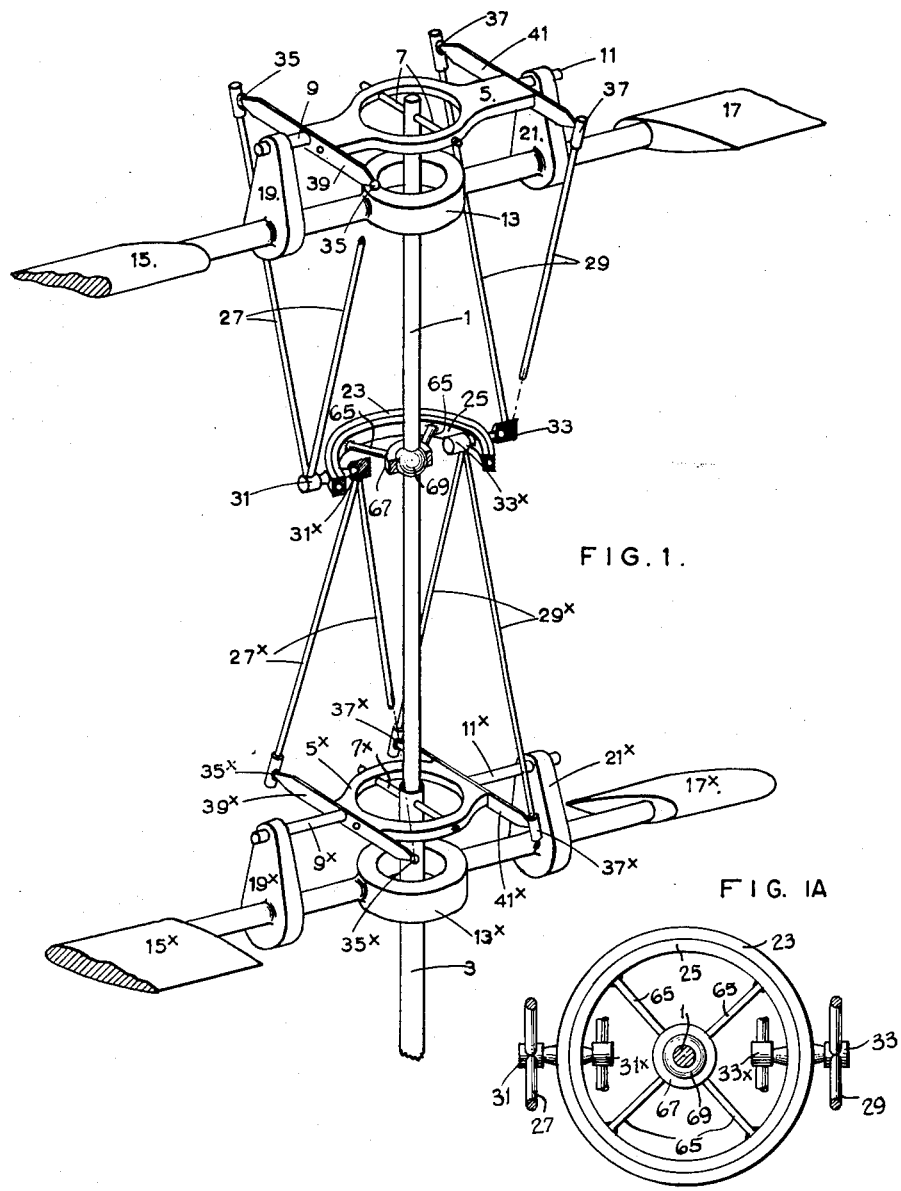
FIGURE 1A is a fragmentary plan view of the transfer bearing assembly according to the invention together with its centering means.

Referring to FIGURE 1, 1 and 3 are the coaxial, contrarotative axles of the upper and lower rotors respectively. The upper rotor comprises a "hub" or rocking member 5 mounted on the shaft 1 by means of a flapping pivot pin 7 and having coaxial pivot pins 9, 11 perpendicular to the flapping pivot, on which the rotor, comprising a floating hub-like member 13 and blades 15, 17 rigidly attached thereto, is suspended by means of lugs 19, 21 rigidly attached to the member 13, the blade span axis being parallel to the axis of the pivot pins 9, 11.

Partial rotation of the rotor structure 13, 15, 17, 19, 21 about the pivots 9, 11 in a clockwise sense (as seen in the figure) decreases the pitch of blade 15 and increases that of blade 17 by an equal amount; and rotation in the opposite sense increases the pitch of blade 15 and decreases that of blade 17, thus enabling cyclic pitch control to be effected by means not illustrated, and per se having no relevance to the present invention.

The lower rotor is similarly constructed, the parts thereof corresponding to those of the upper rotor being identified by the same reference characters distinguished by the suffix x.

The transfer bearing assembly which is free to tilt in any azimuthal plane containing the rotor axis comprises two race members 23, 25 each free to rotate independently about the rotor axis. The transfer bearing assembly 23, 25 is centered by a universal ball-joint bearing comprising a ball 69 fixedly mounted on a shaft 1, rotatably engaging the inner, female, spherical surface of a ring 67, which ring is rigidly attached by arms or spokes 65 to the race member 25. As best seen in the fragmentary plan view, FIGURE 1A, the ring 67 surrounds ball 69 in contact therewith and any suitable number of arms 65, such as four, are rigidly fastened between ring 67 and race member 25. Member 23 is universally jointed at diametrically opposite points 31, 33, to parallel linkages, each composed of two rods 27 (or 29) whose upper ends are universally jointed at 35 or 37 to opposite ends of a bar 39 (or 41) rigidly secured to the hub or rocking member 5; bars 39 and 41 being parallel to the flapping pivot pin 7, equidistant therefrom on opposite sides thereof, and the joints 35, 37 being equidistant from the common axis of pivot pins 9, 11, so that the pairs of links 27 (or 29) constitute a linkage frame which constrains the race member 23 to rotate with the hub (or rocking member) 5, and is otherwise equivalent to a single link pivotally connected to the hub 5 about an axis parallel to the flapping pivot pin 7.

Similar parallel linkages interconnect the race member 25 with the lower rotor's hub or rocking member 5x, parts of the last mentioned linkages corresponding to those of the linkages of the upper rotor being identified by the same reference characters distinguished by the suffix x.

The universal joints 31, 33 and 31x, 33x of the transfer bearing assembly and the centre of the ball 69 and of the spherical surface of ring 67 are all coplanar. Also, the flapping pivot pins 7 and 7x lie respectively in the plane defined by the universal joints 35, 37 and the plane defined by the universal joints 35x, 37x.

It will be evident from inspection of the drawing that this embodiment operates to impose a partial mutual constraint on the flapping motions of the upper and lower rotors, such that the constraint is complete, making the flapping angles of both rotors the same, when the rotor blades cross-over each other, in the same azimuthal plane containing the rotor axis, i.e. in the position illustrated, and that there is no mutual constraint when the azimuthal positions of the upper and lower rotor blades respectively are mutually at right angles.

Figure 2:
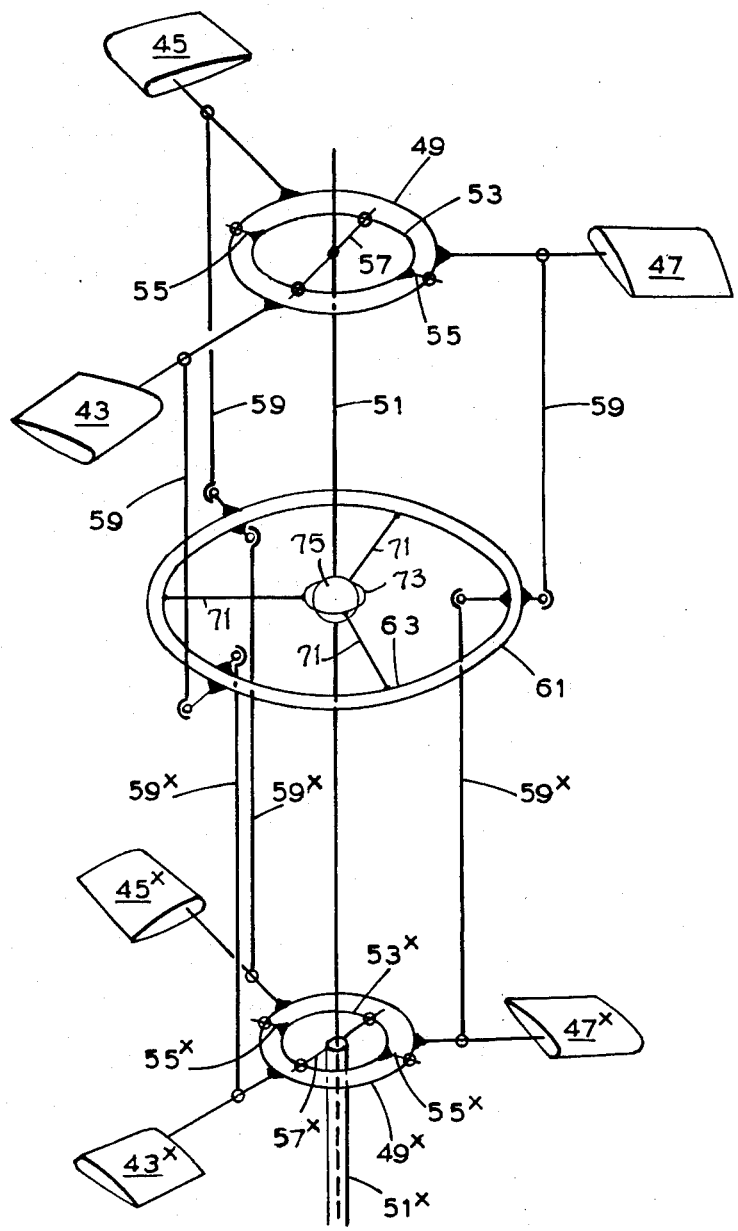
FIGURE 2 illustrates, even more schematically, in perspective the second embodiment, which has two, three-bladed rotors, the blades of which are mounted, without freedom to flap independently, on hubs which are universally jointed to the rotor axles, so as to be free to flap in any azimuth.

Referring to FIGURE 2, the upper rotor has three blades 43, 45, 47 mounted by means of feathering pivots for pitch variation and control (not shown) on blade roots which are rigidly connected to a hub 49, the latter being universally jointed to the rotor axle 51 by means of a gimbal mounting comprising a ring 53 and mutually perpendicular pivots 55, 57.

The lower rotor is similarly constituted, corresponding parts being identified by the same reference characters distinguished by the suffix x. The upper rotor axle 51 is coaxially nested in the lower rotor axle 51x.

The transfer bearing assembly comprises two race members 61, 63 and is suspended from axle 51 by centering means 71, 73, 75, shown very diagrammatically in FIGURE 2. The centering means is a universal ball-joint bearing the same as in the first embodiment, and comprises the ball 75 affixed to axle 51, the surrounding ring 73, and three arms 71 rigidly interconnecting the ring 73 and race member 63. Thus the bearing assembly is kept concentric with the rotor axis and is free to tilt about any axis perpendicular to the rotor axis. Race member 61 is constrained to rotate with the upper rotor axle 51 by any convenient means (not shown) and race member 63 is similarly constrained with respect to the lower rotor axle 51x.

The several blades roots of the upper rotor are connected with the race member 61 by links 59 lying in planes containing the rotor axis and universally jointed at both ends; and the lower rotor's blade roots are similarly connected to the race member 63 by links 59x.

As in FIGURE 1, the center of the ball 75 is coplanar with the universal joints at the lower ends of links 59 and with the universal joints at the upper ends of links 59x. The universal joints at the upper ends of links 59 are coplanar with the center of the gimbal assembly 49, 53, 55, 57, and the universal joints at the lower ends of the links 59x are likewise coplanar with the center of the gimbal assembly 49x, 53x, 55x, 57x.

In this embodiment the mutual constraint imposed on the flapping motions of the upper and lower rotors by the linkages 59, 59x and transfer bearing assembly 61, 63 is complete so that the flapping angles of both rotors, in all azimuths and at all times, are the same.

What I claim is:

1. An aircraft lifting or/and sustaining rotor system comprising a pair of similar coaxial, contra-rotative rotors, each rotor including: a generally vertical, rotary axis member; hub means tiltably mounted on the axis member for tilting in at least one azimuth about a central flapping pivot; at least two radially extending blades rigidly interconnected and thus constrained against flapping independently; and means, including articular, blade pitch varying lugs, for mounting said radially extending blades upon and below said hub means; said system further including: a bearing assembly disposed between the rotors and comprising two concentric race members free to rotate independently of one another in their common plane and about their common centre; means centering said race members on said axis member and allowing their common plane to tilt freely with respect to said axis member in any azimuth; a first linkage means so interconnecting one of said race members with the hub means of one of said rotors as to be rotatable therewith; and a second similar linkage means interconnecting the other of said race members with the hub means of the other of said rotors, both said linkage means being connected with the race members by means of universal joints, which are all coplanar with the center about which the race members are tiltable, and each said linkage means being connected with its associated rotor hub means by universal joints coplanar with the central point about which the last-named hub means is tiltable.

2. A lifting or/and sustaining rotor system for aircraft comprising a pair of similar, coaxial contrarotative rotors each having two rigidly interconnected blades, each such rotor comprising: a generally vertical rotary axis member; flapping pivot means for interconnecting said blades with said axis member to provide tilting of said blades in at least one azimuth about a central point; and means for mounting said blades upon and below said flapping pivot means to extend radially and oppositely from said axis member; said rotor system further including: a bearing assembly disposed between said rotors and comprising two concentric race members, free to rotate independently of each other about their common center; means centering said race members on the common rotational axis of said axis members with freedom to tilt in any azimuth with respect to said axis about their common centre; linkage means connecting one of said race members with one of said rotors; and similar linkage means connecting the other of said race members with the other of said rotors, each of said linkage means being connected to its associated rotor by universal joints coplanar with the central point about which the associated blades are tiltable and each of said linkage means being universally jointed to its associated race member at at least one point in a plane containing said rotational axis and perpendicular to the axis of the flapping pivot means of its associated component rotor, said universal joint points lying in a common plane containing the common center of said race members.

3. An aircraft lifting or/and sustaining rotor system comprising a pair of similar, coaxial contra-rotative rotors; each rotor including a generally vertical, rotary axis member, a hub member, a single flapping pivot intersecting said axis member, said hub member being articulated on said flapping pivot, a pair of rigidly interconnected blades extending radially and oppositely from said axis member and substantially at right angles to said flapping pivot, articular means interconnecting said blades with said hub member for blade pitch variation, said hub member including at least one rigidly attached bar parallel with and offset from said flapping pivot; said rotor system further including a bearing assembly disposed between said rotors and comprising two concentric race members free to rotate independently of each other about their common center, and means centering said race members on the common rotational axis of said axis members with freedom to tilt in any azimuth about the common center of said race members with respect to said axis, linkage means connecting one of said race members with the hub member of one of said rotors, and similar linkage means connecting the other said race member with the hub member of the other of said rotors, each such linkage means comprising a V-shaped assembly, the apex of which is universally jointed to its associated race member at a point in a plane containing said rotational axis and perpendicular to the flapping pivot of its associated rotor, said universal joint pivots being coplanar with the common center of said race members, and the base of each said V-shaped assembly being articulated at each end to the ends of the bar of the associated hub member.

References Cited by the Examiner

UNITED STATES PATENTS

| | | | |
|---|---|---|---|
| 2,122,928 | 7/38 | Breguet | 170—135.26 |
| 2,162,794 | 6/39 | Von Asboth | 170—160.27 |
| 2,256,918 | 9/41 | Young | 170—135.26 |
| 2,829,721 | 4/58 | Gebhard | 170—135.26 |
| 2,980,186 | 4/61 | Strong | 170—135.26 |

FOREIGN PATENTS

| | | |
|---|---|---|
| 1,069,761 | 2/54 | France. |
| 1,202,127 | 7/59 | France. |
| 176,395 | 8/61 | Sweden. |

SAMUEL LEVINE, *Primary Examiner.*

MILTON BUCHLER, ABRAM BLUM, JULIUS E. WEST, *Examiners.*